US012105605B2

(12) United States Patent
Kawaguchi

(10) Patent No.: US 12,105,605 B2
(45) Date of Patent: Oct. 1, 2024

(54) DATA REPLICATION CONTROL FOR HIGH AVAILABLE SYSTEM

(71) Applicant: Hitachi, Ltd., Tokyo (JP)

(72) Inventor: Tomohiro Kawaguchi, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 127 days.

(21) Appl. No.: 18/081,572

(22) Filed: Dec. 14, 2022

(65) Prior Publication Data
US 2024/0202085 A1      Jun. 20, 2024

(51) Int. Cl.
G06F 11/00      (2006.01)
G06F 11/20      (2006.01)

(52) U.S. Cl.
CPC .... *G06F 11/2094* (2013.01); *G06F 2201/805* (2013.01)

(58) Field of Classification Search
CPC ............. G06F 11/0793; G06F 11/1425; G06F 11/1464; G06F 11/1471; G06F 11/2046; G06F 11/2094
See application file for complete search history.

(56) References Cited

U.S. PATENT DOCUMENTS

| | | | |
|---|---|---|---|
| 8,161,256 B2 | 4/2012 | Hara et al. | |
| 9,632,701 B2 | 4/2017 | Watanabe et al. | |
| 10,114,691 B2 | 10/2018 | Johri et al. | |
| 2012/0246511 A1* | 9/2012 | Sato | G06F 11/2094 714/6.2 |
| 2021/0382799 A1* | 12/2021 | Kawaguchi | G06F 16/1815 |

* cited by examiner

*Primary Examiner* — Michael Maskulinski
(74) *Attorney, Agent, or Firm* — PROCOPIO, CORY, HARGREAVES & SAVITCH LLP

(57) ABSTRACT

A method for redundancy loss recovery. The method may include creating pairs of quorum sets, wherein each pair of the pairs of quorum sets comprises at least two volumes and a quorum, and each of at least two volumes and quorum are located at different storage devices; for a failure occurring in a storage device associated with the pairs of quorum sets or in a network communication between storage devices of the pairs of quorum sets, modifying volume attributes associated with volumes of the pairs of quorum sets; and for the failure occurring in a storage device associated with the pairs of quorum sets, relocating quorum associated with the failed storage device to another storage device that is different from storage devices associated with the pairs of quorum sets.

13 Claims, 20 Drawing Sheets

State 00
Initial State

State 01
After storage 100a failure in State 00.

State 02
After storage 100b failure in State 00.

State 03
After storage 100c failure in State 00.

| Volume# 101-1-1 | Volume Attrib. 101-1-2 | UUID 101-1-3 | External Vol UUID 101-1-4 |
|---|---|---|---|
| 1 | LU | 900...724 | - |
| 2 | LU | 9a3...835 | - |
| 3 | Quorum | - | 943...ed6 |
| 4 | Quorum | - | 96d...a72 |
| 5 | Quorum Candidate | - | 972...b51 |

Volume Management Table 101-1a

| Pair# 101-2-0 | Volume# 101-2-1 | Pair Attrib. 101-2-2 | Volume Attrib. 101-2-3 | Pair Strg# 101-2-4 | Pair Volume# 101-2-5 | Quorum ID 101-2-6 | Quorum LBA 101-2-7 | Pair State 101-2-8 |
|---|---|---|---|---|---|---|---|---|
| 1 | 1 | Sync | Primary | 2 | 1 | 3 | 0 | PAIR |
| 2 | 1 | Async | Primary | 3 | 1 | 4 | 0 | SUSP |
| 3 | - | - | - | - | - | - | - | - |
| 4 | - | - | - | - | - | - | - | - |

Pair Management Table 101-2a

Storage Device 100a

FIG. 4

| Volume# 101-1-1 | Volume Attrib. 101-1-2 | UUID 101-1-3 | External Vol UUID 101-1-4 |
|---|---|---|---|
| 1 | LU | 947...992 | - |
| 2 | LU | 96d...a72 | - |
| 3 | Quorum | - | 943...ed6 |
| 4 | Quorum | - | 9a3...835 |
| 5 | Quorum Candidate | - | 972...b51 |

Volume Management Table 101-1b

| Pair# 101-2-1 | Volume# 101-2-1 | Pair Attrib. 101-2-2 | Volume Attrib. 101-2-3 | Pair Strg# 101-2-4 | Pair Volume# 101-2-5 | Quorum ID 101-2-6 | Quorum LBA 101-2-7 | Pair State 101-2-8 |
|---|---|---|---|---|---|---|---|---|
| 1 | 1 | Sync | Second | 1 | 1 | 3 | 0 | PAIR |
| 2 | 1 | Async | Primary+ | 3 | 1 | 4 | 0 | SUSP |
| 3 | - | - | - | - | - | - | - | - |
| 4 | - | - | - | - | - | - | - | - |

Pair Management Table 101-2b

Storage Device 100b

FIG. 5

| Volume# 101-1-1 | Volume Attrib. 101-1-2 | UUID 101-1-3 | External Vol UUID 101-1-4 |
|---|---|---|---|
| 1 | LU | 947...992 | - |
| 2 | LU | 943...ed6 | - |
| 3 | Quorum | - | 96d...a72 |
| 4 | Quorum | - | 9a3...835 |
| 5 | Quorum Candidate | - | 972...b51 |

Volume Management Table 101-1c

| Pair# 101-2-1 | Volume# 101-2-1 | Pair Attrib. 101-2-2 | Volume Attrib. 101-2-3 | Pair Strg# 101-2-4 | Pair Volume# 101-2-5 | Quorum ID 101-2-6 | Quorum LBA 101-2-7 | Pair State 101-2-8 |
|---|---|---|---|---|---|---|---|---|
| 1 | 1 | Async | Second- | 1 | 1 | 3 | 0 | PAIR |
| 2 | 1 | Async | Primary | 2 | 1 | 4 | 0 | SUSP |
| 3 | - | - | - | - | - | - | - | - |
| 4 | - | - | - | - | - | - | - | - |

Pair Management Table 101-2c

Storage Device 100c

FIG. 6

| Volume# 101-1-1 | Volume Attrib. 101-1-2 | UUID 101-1-3 | External Vol UUID 101-1-4 |
|---|---|---|---|
| 1 | LU | 972...b51 | - |
| 2 | - | - | - |
| 3 | - | - | - |
| 4 | - | - | - |
| 5 | - | - | - |

Volume Management Table 101-1d

| Pair# 101-2-1 | Volume# 101-2-1 | Pair Attrib. 101-2-2 | Volume Attrib. 101-2-3 | Pair Strg# 101-2-4 | Pair Volume# 101-2-5 | Quorum ID 101-2-6 | Quorum LBA 101-2-7 | Pair State 101-2-8 |
|---|---|---|---|---|---|---|---|---|
| 1 | - | - | - | - | - | - | - | - |
| 2 | - | - | - | - | - | - | - | - |
| 3 | - | - | - | - | - | - | - | - |
| 4 | - | - | - | - | - | - | - | - |

Pair Management Table 101-2d

Storage Device 100d

FIG. 7

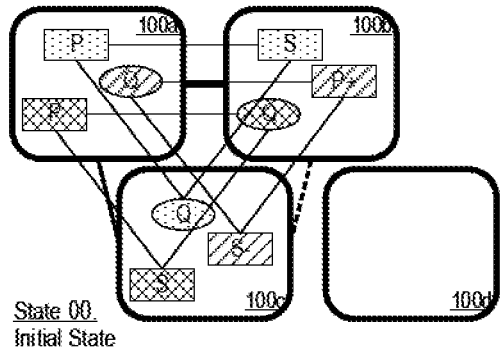
State 00.
Initial State
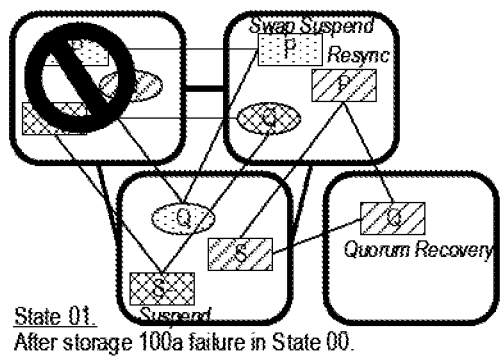
State 01.
After storage 100a failure in State 00.
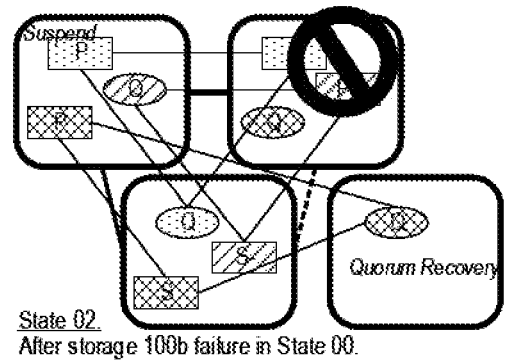
State 02.
After storage 100b failure in State 00.
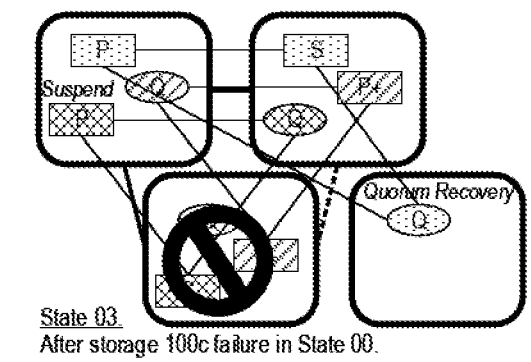
State 03.
After storage 100c failure in State 00.
FIG. 10-1

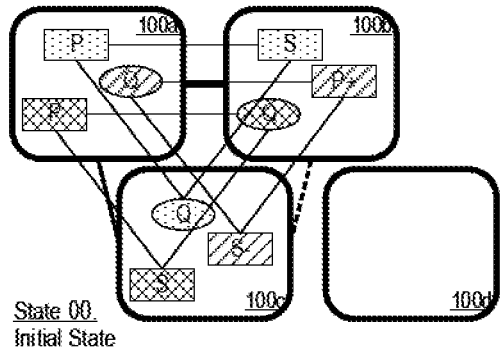
State 00.
Initial State
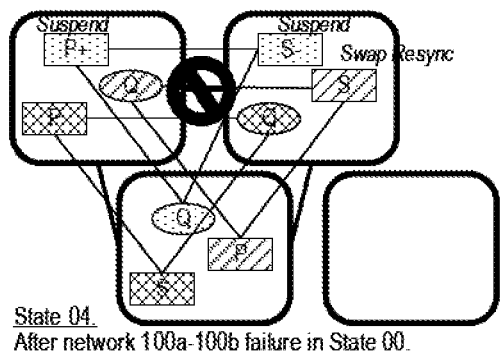
State 04.
After network 100a-100b failure in State 00.
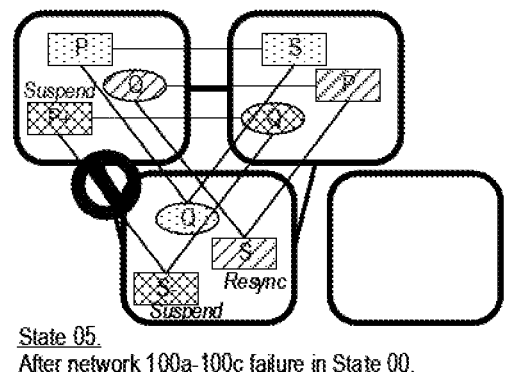
State 05.
After network 100a-100c failure in State 00.
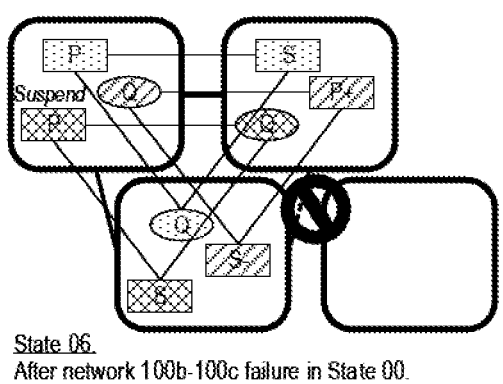
State 06.
After network 100b-100c failure in State 00.
FIG. 10-2

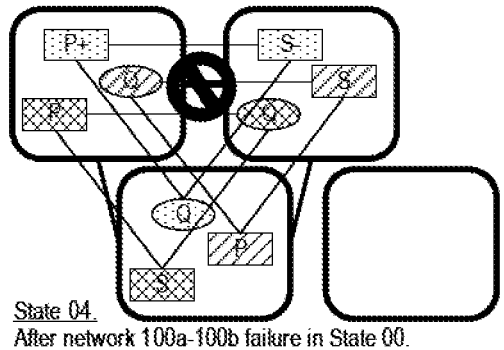
State 04.
After network 100a-100b failure in State 00.
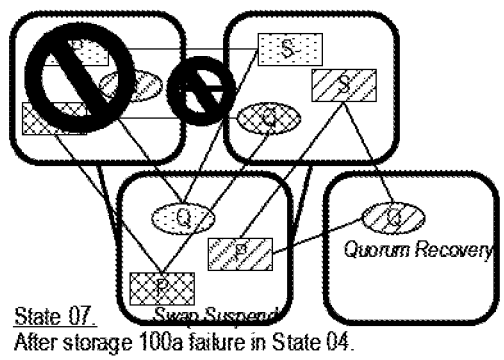
State 07. Swap Suspend
After storage 100a failure in State 04.
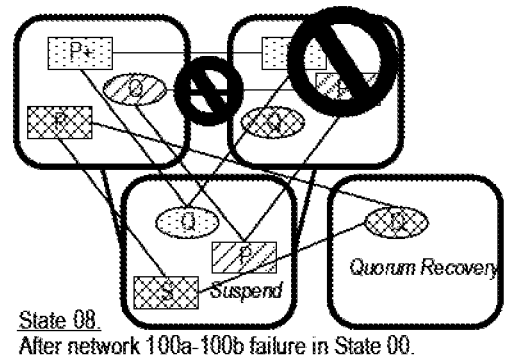
State 08.
After network 100a-100b failure in State 00.
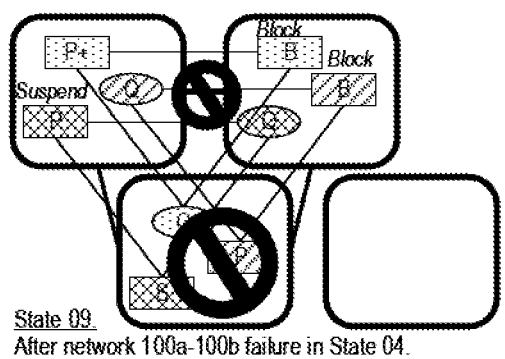
State 09.
After network 100a-100b failure in State 04.
FIG. 10-3

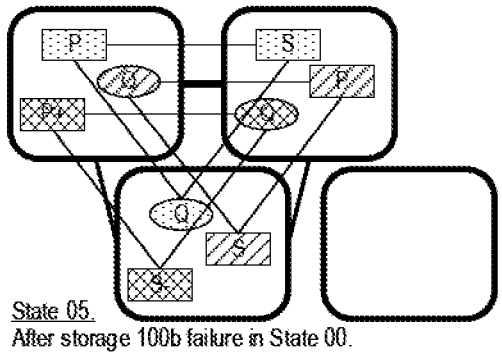
State 05.
After storage 100b failure in State 00.
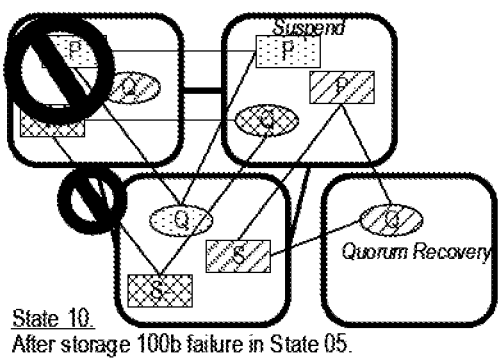
State 10.
After storage 100b failure in State 05.
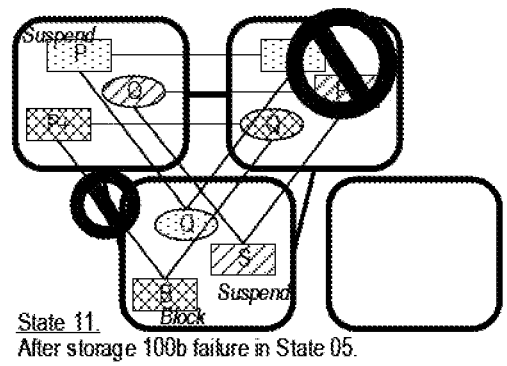
State 11.
After storage 100b failure in State 05.
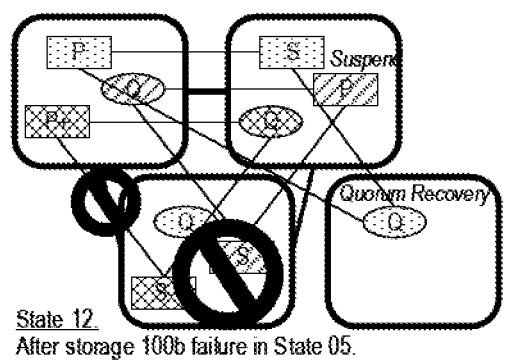
State 12.
After storage 100b failure in State 05.
FIG. 10-4

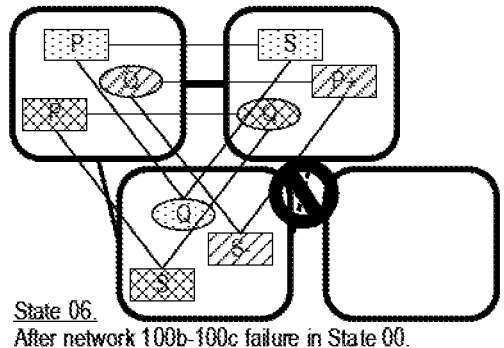
State 06.
After network 100b-100c failure in State 00.
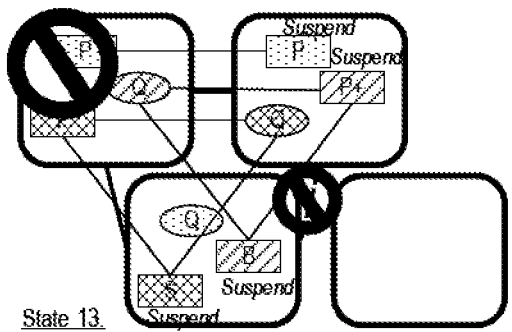
State 13.
After storage 100a failure in State 06.
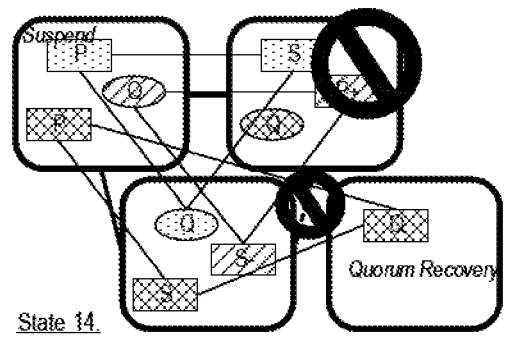
State 14.
After storage 100b failure in State 06.
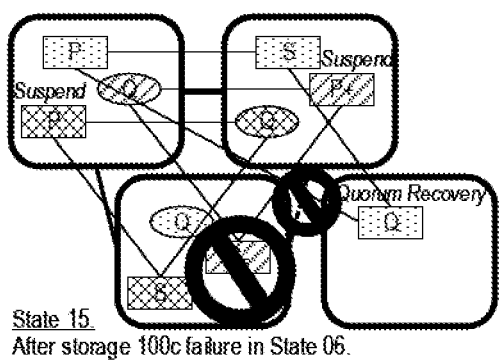
State 15.
After storage 100c failure in State 06.
FIG. 10-5

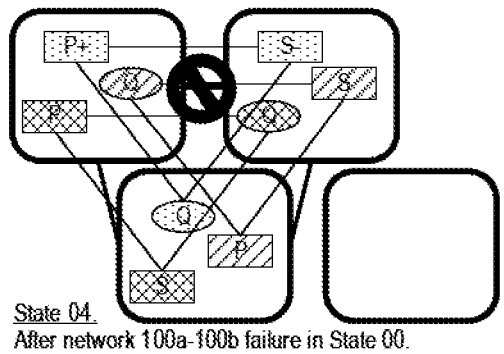
State 04.
After network 100a-100b failure in State 00.
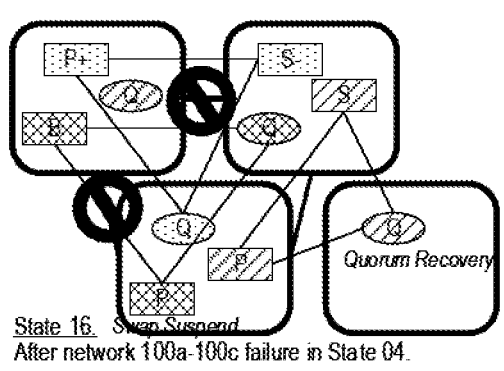
State 16. Swap Suspend
After network 100a-100c failure in State 04.
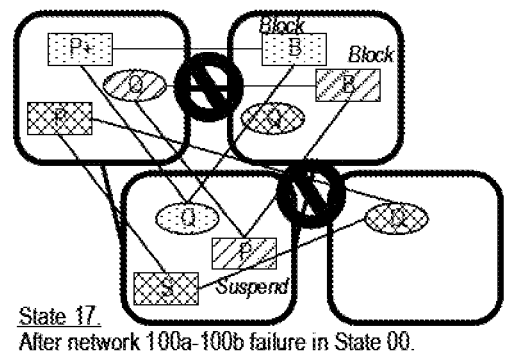
State 17.
After network 100a-100b failure in State 00.
FIG. 10-6

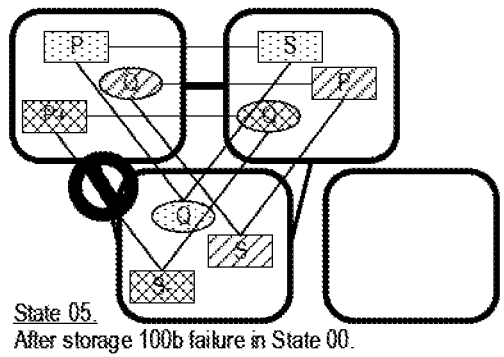
State 05.
After storage 100b failure in State 00.
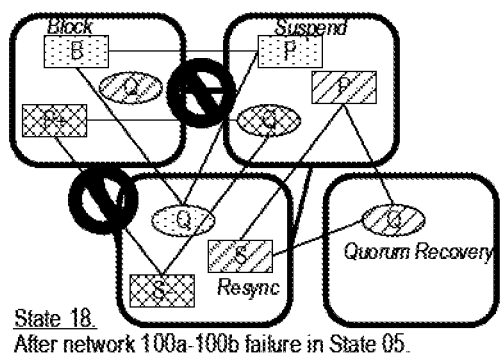
State 18.
After network 100a-100b failure in State 05.
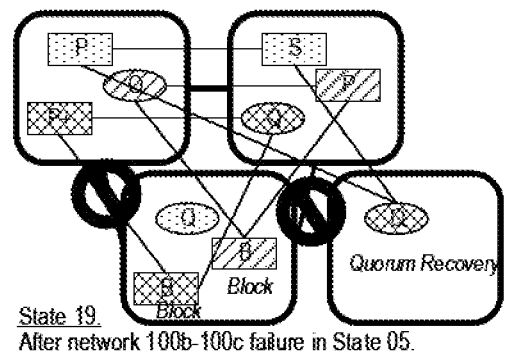
State 19.
After network 100b-100c failure in State 05.
FIG. 10-7

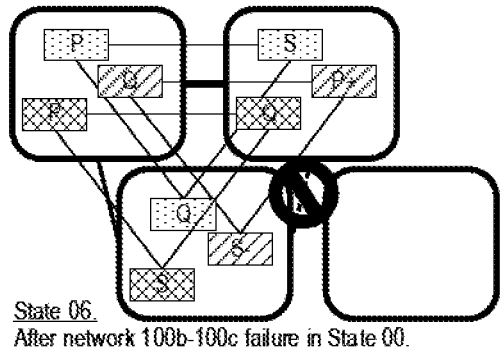
State 06.
After network 100b-100c failure in State 00.
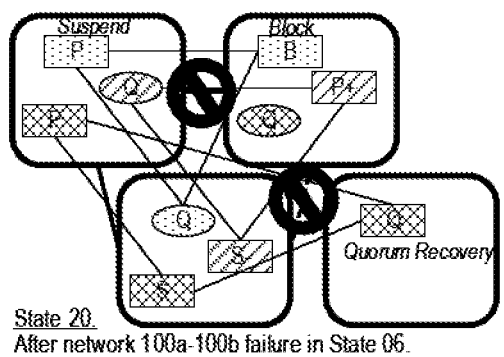
State 20.
After network 100a-100b failure in State 06.
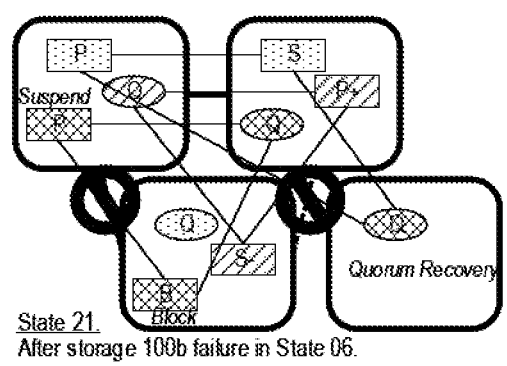
State 21.
After storage 100b failure in State 06.
FIG. 10-8

DATA REPLICATION CONTROL FOR HIGH AVAILABLE SYSTEM

BACKGROUND

Field

The present disclosure is directed to method and system for redundancy loss recovery, specifically through generation of quorum set pairs and modify status associated with quorum set pairs.

Related Art

Generally, important data is stored redundantly between remote locations to avoid loss against disaster such as fire, waterflood, earthquake, terrorism, and etc. Storage devices provide features known as "storage remote copy," which copies data between paired storage volumes and maintains data consistency when a data write operation from host computer takes place. The feature is further categorized into synchronous storage remote copy and asynchronous remote copy.

The storage devices that store the paired storage volumes are each located sites that are far enough away from each other that they will not be affected at the same time should an event occur. This reduces the risk of losing both volumes at the same time.

In the related art, a data replication method utilizes two or more sites in performing data replication, such that the redundant configuration can continue against one site fail or shut down for maintenance.

In the related art, a detection method is utilized in detection of failure occurrence of peer device or network by checking the communication between the storage devices and checking the survival information using a quorum located at a fixed third site, and automatically suspending the replication or performing failover.

When recovering from a loss of redundancy due to a failure, it is necessary to implement a recovery method based on the broken part, which can be complicated in itself. The complex procedure may lead to risk of failure and prolonged period of reduced availability. In addition, as cloud-native operations become increasingly popular, IT systems are required to automatically recover in the event of a failure.

SUMMARY

Aspects of the present disclosure involve an innovative method for redundancy loss recovery. The method may include creating pairs of quorum sets, wherein each pair of the pairs of quorum sets comprises at least two volumes and a quorum, and each of at least two volumes and quorum are located at different storage devices; for a failure occurring in a storage device associated with the pairs of quorum sets or in a network communication between storage devices of the pairs of quorum sets, modifying volume attributes associated with volumes of the pairs of quorum sets; and for the failure occurring in a storage device associated with the pairs of quorum sets, relocating quorum associated with the failed storage device to another storage device that is different from storage devices associated with the pairs of quorum sets.

Aspects of the present disclosure involve an innovative non-transitory computer readable medium, storing instructions for redundancy loss recovery. The instructions may include creating pairs of quorum sets, wherein each pair of the pairs of quorum sets comprises at least two volumes and a quorum, and each of at least two volumes and quorum are located at different storage devices; for a failure occurring in a storage device associated with the pairs of quorum sets or in a network communication between storage devices of the pairs of quorum sets, modifying volume attributes associated with volumes of the pairs of quorum sets; and for the failure occurring in a storage device associated with the pairs of quorum sets, relocating quorum associated with the failed storage device to another storage device that is different from storage devices associated with the pairs of quorum sets.

Aspects of the present disclosure involve an innovative server system for redundancy loss recovery. The server system may include creating pairs of quorum sets, wherein each pair of the pairs of quorum sets comprises at least two volumes and a quorum, and each of at least two volumes and quorum are located at different storage devices; for a failure occurring in a storage device associated with the pairs of quorum sets or in a network communication between storage devices of the pairs of quorum sets, modifying volume attributes associated with volumes of the pairs of quorum sets; and for the failure occurring in a storage device associated with the pairs of quorum sets, relocating quorum associated with the failed storage device to another storage device that is different from storage devices associated with the pairs of quorum sets.

Aspects of the present disclosure involve an innovative system for redundancy loss recovery. The system can include means for creating pairs of quorum sets, wherein each pair of the pairs of quorum sets comprises at least two volumes and a quorum, and each of at least two volumes and quorum are located at different storage devices; for a failure occurring in a storage device associated with the pairs of quorum sets or in a network communication between storage devices of the pairs of quorum sets, means for modifying volume attributes associated with volumes of the pairs of quorum sets; and for the failure occurring in a storage device associated with the pairs of quorum sets, means for relocating quorum associated with the failed storage device to another storage device that is different from storage devices associated with the pairs of quorum sets.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

FIG. 4 illustrates examples of volume management table 101-1a and pair management table 101-2a as shown in FIG. 2, in accordance with an example implementation.

FIG. 5 illustrates examples of volume management table 101-1*b* and pair management table 101-2*b* as shown in FIG. 2, in accordance with an example implementation.

FIG. 6 illustrates examples of volume management table 101-1*c* and pair management table 101-2*c* as shown in FIG. 2, in accordance with an example implementation.

FIG. 7 illustrates examples of volume management table 101-1*d* and pair management table 101-2*d* as shown in FIG. 2, in accordance with an example implementation.

FIG. 10-1 illustrates example state transitions in the event of a storage device failure, in accordance with an example implementation.

FIG. 10-2 illustrates example state transitions in the event of a network path failure, in accordance with an example implementation.

FIG. 10-3 illustrates example state transitions in the case of a failure on one storage device in state 04, in accordance with an example implementation.

FIG. 10-4 illustrates example state transitions in the case of a failure on one storage device in state 05, in accordance with an example implementation.

FIG. 10-5 illustrates example state transitions in the case of a failure on one storage device in state 06, in accordance with an example implementation.

FIG. 10-6 illustrates example state transitions in the case of a failure on one storage device in state 04, in accordance with an example implementation.

FIG. 10-7 illustrates example state transitions in the case of a failure on one storage device in state 05, in accordance with an example implementation.

FIG. 10-8 illustrates example state transitions in the case of a failure on one storage device in state 06, in accordance with an example implementation.

DETAILED DESCRIPTION

Figure 1:
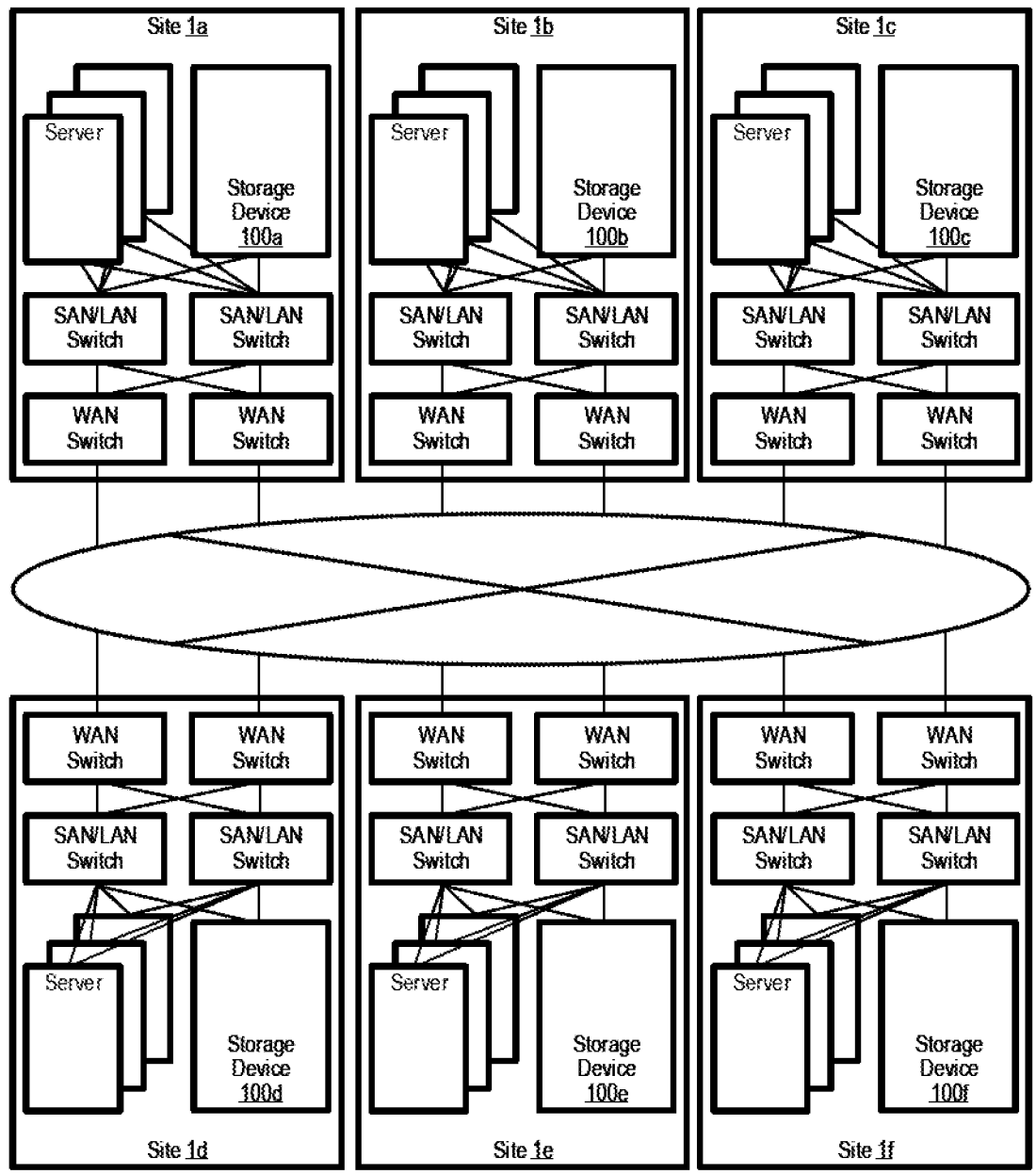
FIG. 1 illustrates an example of data replication control system, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations utilize a configuration of four or more interconnected sites, each of which can have a storage device or storage software capable of providing remote copy functionality. Volumes and quorums are formed on each site. Example implementations provide for the selection of two volumes and one quorum at different sites informing form a pair. A total of three pairs are configured in three of the four or more interconnected sites. Data updates that occur on the volumes will be reflected on the remaining two volumes via network connection. Based on the data transfer between the pairs and the survival information in the quorum, a failure of the pair partner or the network can be identified and used to suspend the pair. When a device failure is detected in a pair, the quorum at the same site is assumed to have failed as well, and a replacement quorum is reallocated to a site other than the three sites in question.

FIG. 1 illustrates an example of data replication control system, in accordance with an example implementation. As illustrated in FIG. 1, the system has multiple sites 1*a*, 1*b*, 1*c*, 1*d*, 1*e*, and 1*f*. In some example implementations, four sites or more may be included in the system. The sites 1*a*-1*f* are connected by a network or combination of networks (e.g., the Internet, local area network, wide area network, a telephonic network, a cellular network, satellite network, and the like).

Each of sites 1*a*-1*f* may include servers, a storage device 100, and storage area network (SAN)/local area network (LAN) switches. The servers and storage device 100 within a site are connected by the SAN/LAN switches. In some example implementations, a site may include a wide area network (WAN) switch to facilitate communications between network and the site. Take site 1*a* as example. Site 1*a* includes a number of servers, a storage device 100*a*, a number of SAN/LAN switches, and a number of WAN switches. Storage device 100 may be provided by general purpose computers running storage software. In operation, if an application is working on a server, the associated data may be stored in a storage device 100 located at the same site.

Figure 2:
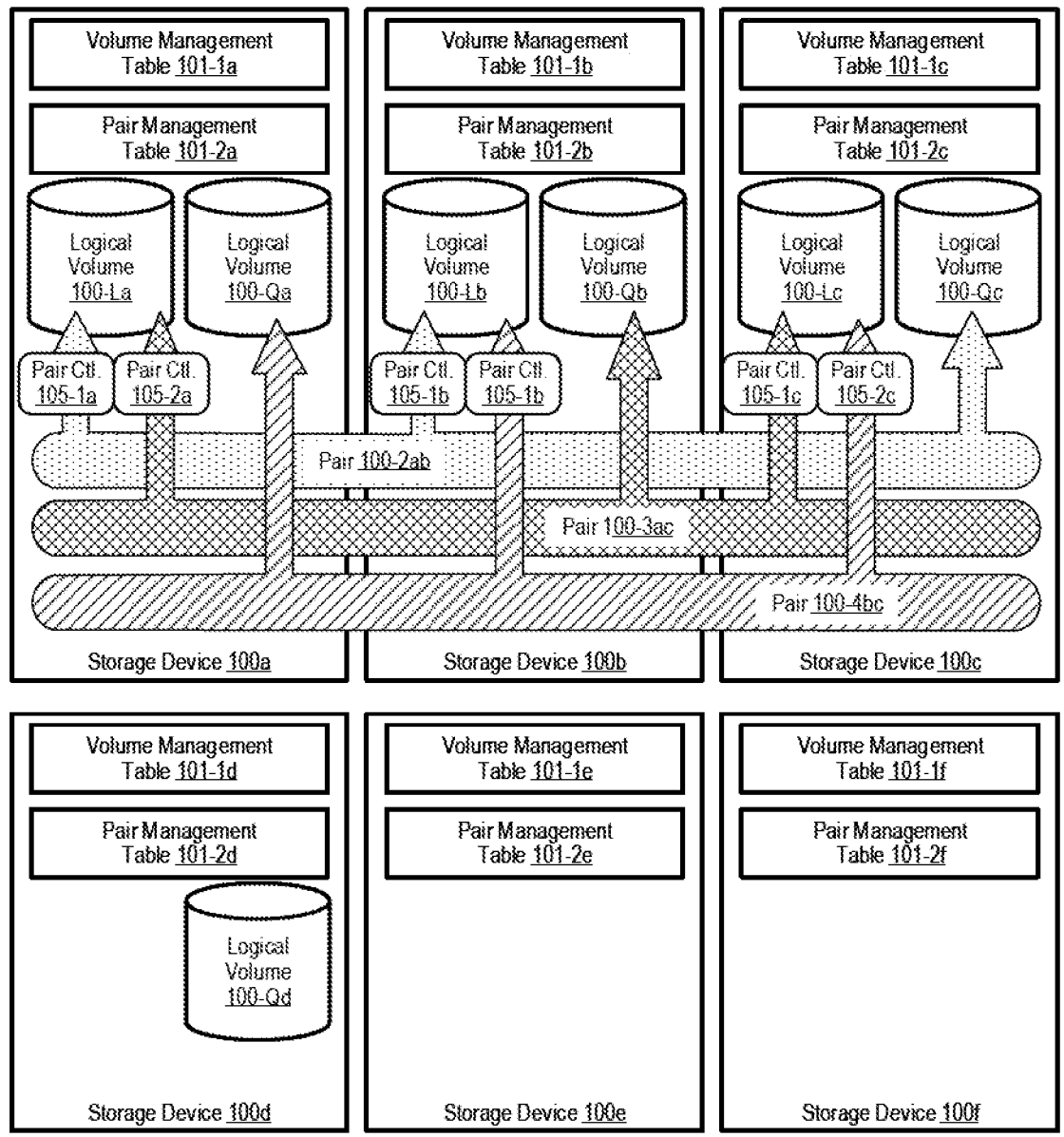
FIG. 2 illustrates an example logical configuration of the storage system, in accordance with an example implementation.

FIG. 2 illustrates an example logical configuration of the storage system, in accordance with an example implementation. Each of storage devices 100*a-f* may include a volume management table 101-1 to manage the volumes provided, and a pair management table 101-2 to manage configuration and status of a replication pair. A replication pair is created when a provided volume establishes a replication pairing with a volume of another storage device.

As illustrated in FIG. 2, the three storage devices 100*a*, 100*b*, and 100*c* each provide two or more logical volumes. One of the provided volumes is for storing data (logical volumes 100-La, 100Lb, and 100-Lc), and the other is for quorum establishment (logical volumes 100-Qa, 100-Qb, and 100-Qc). Data store volumes, such as logical volumes 100-La, 100Lb, and 100-Lc, are provided to servers for storing application data. On the other hand, quorum volumes, such as logical volumes 100-Qa, 100-Qb, and 100-Qc, are provided to storage devices 100 for recording state information, such as an alive state.

The three data store volumes (logical volumes 100-La, 100Lb, and 100-Lc) and the three quorum volumes (logical volumes 100-Qa, 100-Qb, and 100-Qc) make up a group, and two data store volumes and a quorum volume from different storage devices make up establish a pair. As illustrated in FIG. 2, pair 100-2*ab* comprises logical volume 100-La, 100-Lb, and 100-Qc. Pair 100-3*ac* consists of logical volume 100-La, 100-Lc, and 100-Qb. Pair 100-4*bc* consists of logical volume 100-Lb, 100-Lc, and 100-Qa. Each pair is controlled by pair control programs 105. The pair control program 105 is executed on each datastore volume that establishes a pair to manage pair state, control data replication, and alive confirmation with quorum. Taking pair 100-2*ab* for example, pair control 105-1*a* is executed on logical volume 100-La, and pair control 105-1*b* is executed on logical volume 100-Lb. Communicating between logical volumes within a pair can be achieved through the pair control programs 105. In addition, one or more storage devices, such as storages device 100*d*, may provide one or more volumes. As illustrated in FIG. 2, logical volume 100-Qd is used for quorum.

Figure 3A:
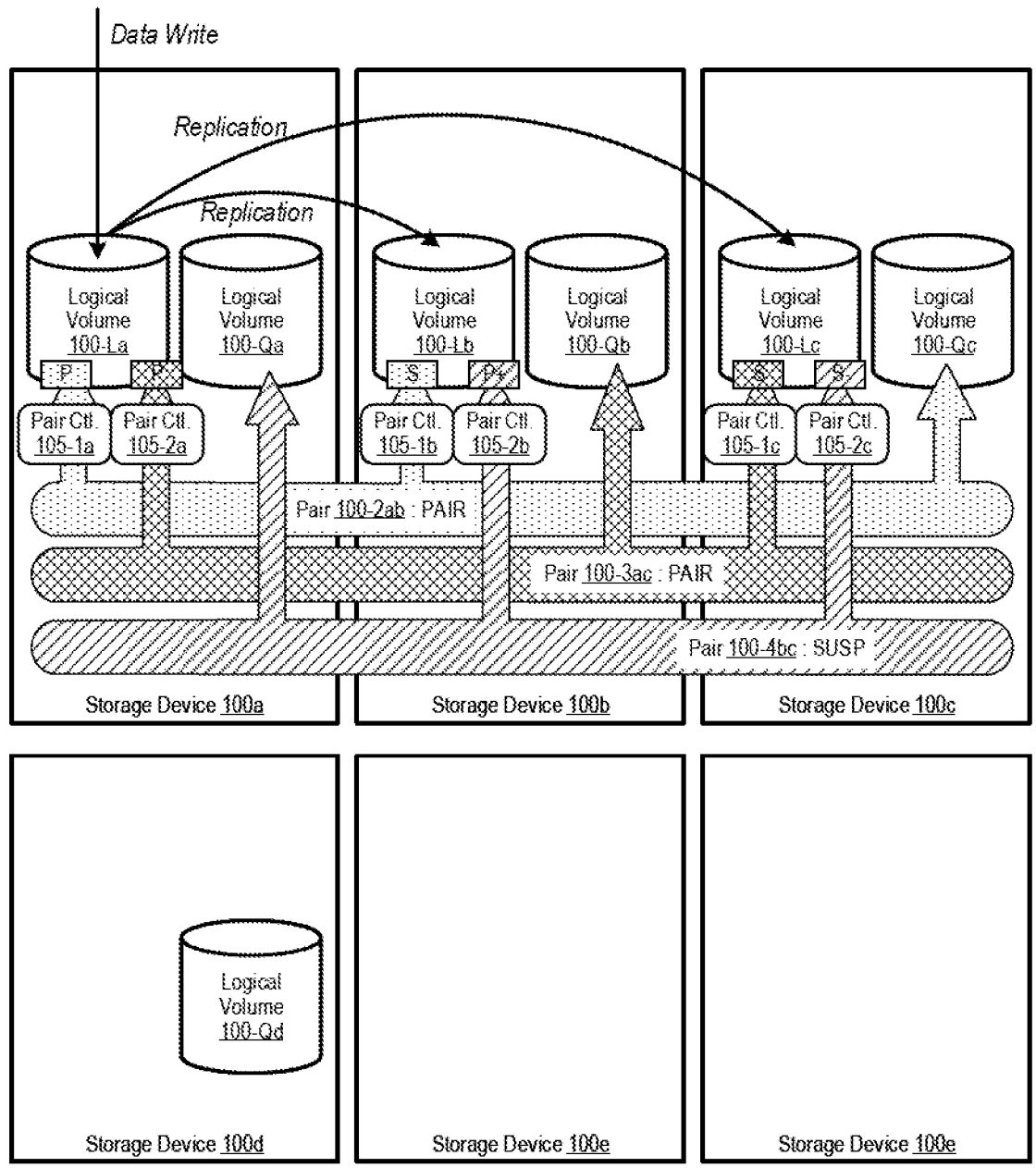
FIG. 3A illustrates an example replication process, in accordance with an example implementation.

FIG. 3A illustrates an example replication process, in accordance with an example implementation. Each pair has one of associated state of SMPL, COPY, PAIR, and PSUS.

SMPL: there is no pair relation;
COPY: during data synchronizing between paired volumes;
PAIR: Data replicating; and
PSUS: temporally suspending the replication.

Every data store volume in a pair has one of the following attributes: Primary, Primary+, Secondary, Secondary−, or Blocked.

Primary (P): data replication source volume;
Primary+ (P+): data replication source volume even if access to the quorum is lost;
Secondary (S): data replication target volume;
Secondary− (S−): data replication target volume as long as access to quorum is possible; and
Blocked: forbitten access.

As illustrated in FIG. 3A, the pairs 100-2*ab* and 100-3*ac* both have the PAIR state, and share the same logical volume 100-La, with attribute Primary. When the logical volume 100-La is updated through a data write operation, pair control program 105-1*a* replicates the change to logical volume 100-Lb and pair control 105-2*a* replicates the change to logical volume 100-Lc.

Figure 3B:
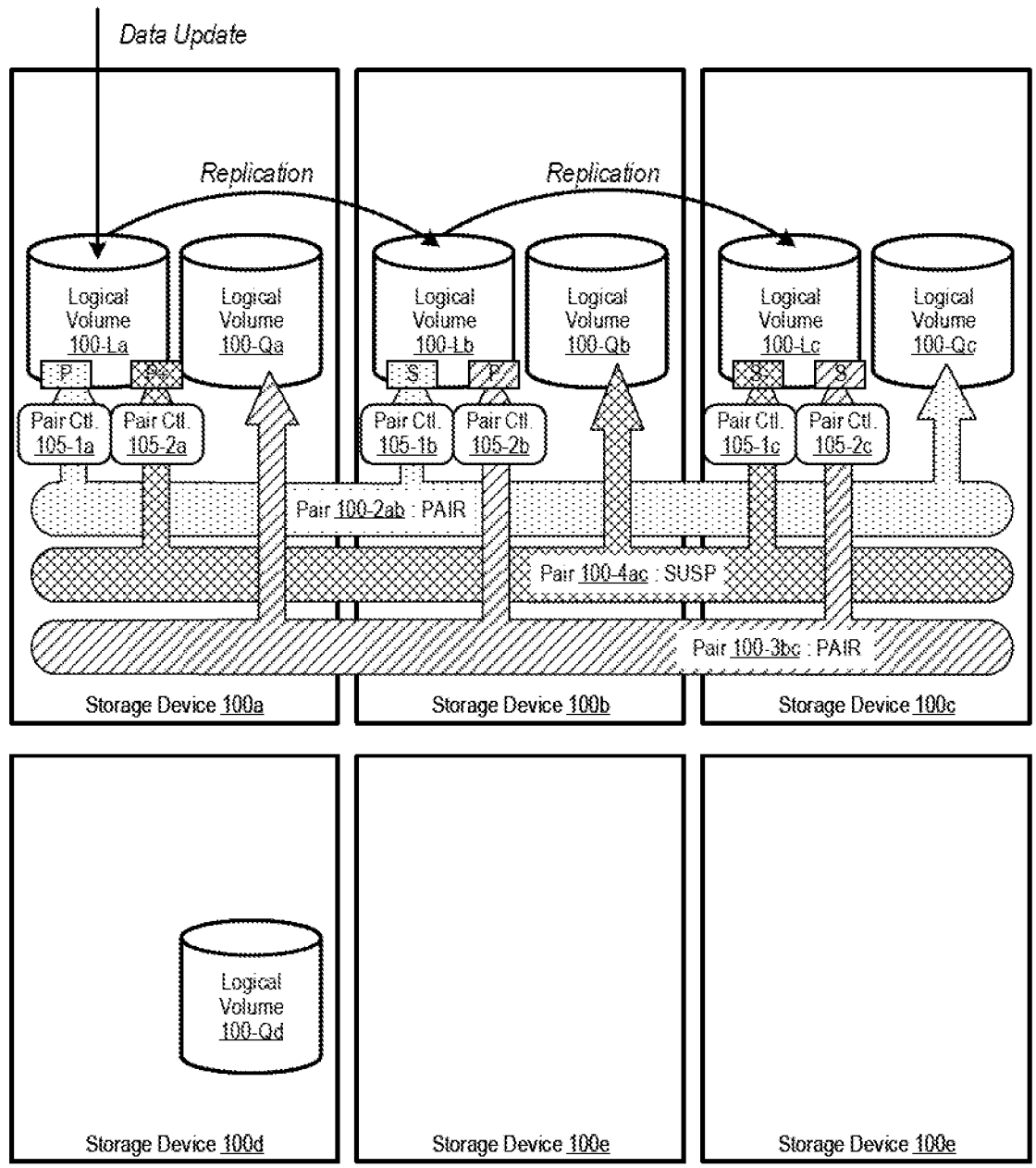
FIG. 3B illustrates an example replication process on other pair, in accordance with an example implementation.

FIG. 3B illustrates an example replication process on other pair, in accordance with an example implementation. As illustrated in FIG. 3B, when the logical volume 100-Lb, the replication target of PAIR state pair 100-2*ab*, becomes the replication source of PAIR state pair 100-3*bc*, replication can be made to replication destination of the pair 100-3*bc*. Therefore, if logical volume 100-La is updated, pair control program 105-1*a* replicates the change to logical volume 100-Lb, and pair control program 105-2*b* detects the update associated with this replication and replicates it to logical volume 100-Lc.

FIG. 4 illustrates examples of volume management table 101-1*a* and pair management table 101-2*a* as shown in FIG. 2, in accordance with an example implementation. The volume management table 101-1*a* stores information for providing logical volumes 100-La and 100-Qa. Volumes 100-Qb, 100-Qc, and 100-Qd provided by storage devices 100*b*, 100*c*, and 100*d* are also stored in this table in order for storage 100*a* to recognize them as available quorum volumes. The volume management table 101-1*a* stores information involving volume number 101-1-1, volume attribution 101-1-2, UUID 101-1-3, and external volume UUID 101-1-4. Volume numbers 101-1-1 represent unique volume identifiers associated with a storage device.

Volume attribution 101-1-2 may store attributions including, but not limited to:
LU: an outside logical volume provided by host computer or storage device.
Quorum: an external volume used for quorum.
Quorum Candidate: an external volume reserved for quorum.

UUID 101-1-3 stores volume ID for logical volumes provided outside. If the volume is not provided outside, then it is not defined. External Volume UUID 101-1-4 stores volume ID for recognizing volumes on other storage devices. No entry is necessary if a volume on other storage device is not used.

The pair management table 101-2*a* stores information for providing pairs 100-2*ab* and 100-3*ac*. The pair management table 101-2 stores information involving pair number 101-2-0, volume number 101-2-1, pair attribution 101-2-2, volume attribution 101-2-3, pair storage number 101-2-4, pair volume number 101-2-5, quorum volume number 101-2-6, quorum LBA 101-2-7, and pair state 101-2-8.

Pair numbers 101-2-0 represent pair identifiers. Volume Number 101-2-1 is used to identify the volume the pair manages. Pair attribution 101-2-2 identifies the type of replication, including, but not limited to, asynchronous copy, synchronous copy, etc. Volume attribution 101-2-3 is a replication attribute of the volume and can be either Primary, Primary+, Secondary, Secondary−, or Block. Pair storage number 101-2-4 identifies the storage device providing the paired volume. Pair volume number 101-2-5 identifies the volume in the storage device that provides the paired volume.

Quorum volume number 101-2-6 stores volume ID of quorum volume listed in volume management table 101-1*a*. Quorum LBA 101-2-7 identifies addresses used to store alive information. Pair state 101-2-8 comprises pair states of SMPL, COPY, PAIR, and PSUS.

As illustrated in FIG. 3A, pair 100-2*ab* uses logical volume 100-La as a primary volume, pairs with logical volume 100-Lb, uses logical volume 100-Qc as a quorum, and replicates synchronously. Pair 100-3*ac* uses logical volume 100-La as a primary volume, pairs with logical volume 100-Lc, uses logical volume 100-Qb as a quorum, and replicates asynchronously.

FIG. 5 illustrates examples of volume management table 101-1*b* and pair management table 101-2*b* as shown in FIG. 2, in accordance with an example implementation. The volume management table 101-1*b* follows the structure of the volume management table 101-1*a* and stores information for providing volumes 100-Lb and 100-Qb. Volumes 100-Qa, 100-Qc, and 100-Qd provided by storage devices 100*a*, 100*c*, and 100*d* are also stored in this table in order for storage 100*b* to recognize them as available quorum volumes.

The pair management table 101-2*b* follows the structure of the volume management table 101-2*a* and stores information for providing pair 100-2*ab* and 100-4*bc*. As illustrated in FIG. 3A, pair 100-2*ab* uses logical volume 100-Lb as a secondary volume, pairs with logical volume 100-La, uses logical volume 100-Qc as quorum, and replicates synchronously. Pair 100-4*bc* uses volume 100-Lb as a primary+ volume, pairs with logical volume 100-Lc, uses volume 100-Qa as a quorum, and replicates asynchronously after pair resync but the pair relationship is suspended.

FIG. 6 illustrates examples of volume management table 101-1*c* and pair management table 101-2*c* as shown in FIG. 2, in accordance with an example implementation. The volume management table 101-1*c* follows the structure of the volume management table 101-1*a* and stores information for providing volumes 100-Lc and 100-Qc. Volumes 100-Qa, 100-Qb, and 100-Qd provided by storage devices 100*a*, 100*b*, and 100*d* are also stored in this table in order for storage 100*c* to recognize them as available quorum volumes.

The pair management table 101-2*c* follows the structure of the volume management table 101-2*a* and stores information for providing pair 100-2*ab* and 100-4*bc*. As illustrated in FIG. 3A, pair 100-3*ac* uses logical volume 100-Lc as a secondary volume, pairs with logical volume 100-La, uses logical volume 100-Qb as a quorum, and replicates asynchronously. Pair 100-4*bc* uses logical volume 100-Lc as a secondary– volume, pairs with logical volume 100-Lb, uses logical volume 100-Qa as a quorum, and replicates asynchronously after pair resync but the pair relationship is suspended.

FIG. 7 illustrates examples of volume management table 101-1*d* and pair management table 101-2*d* as shown in FIG. 2, in accordance with an example implementation. Following the configuration as illustrated in FIG. 3A, the volume management table 101-1*d* follows the structure of the volume management table 101-1*a* and stores information for providing 100-Qd. The pair management table 101-2*d* follows the structure of the volume management table 101-2*a* and stores no information.

Figure 8:
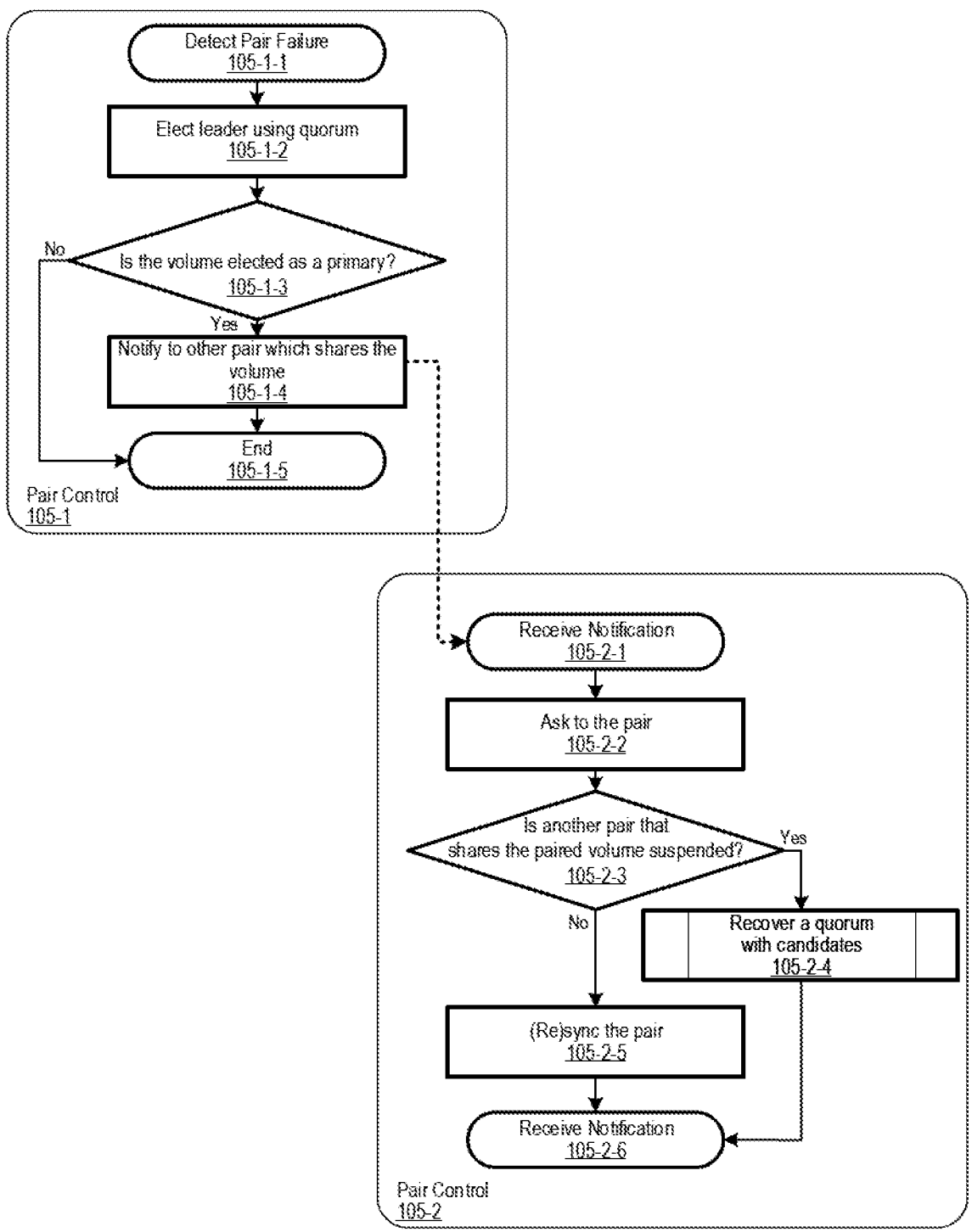
FIG. 8. illustrates example process flow of the failover and recovery process, in accordance with an example implementation.

FIG. 8 illustrates example process flow of the failover and recovery process, in accordance with an example implementation. In example implementations, pair control 105-1 transitions the state of the pair it manages when data replication fails, notifies pair control 105-2 of another pair that shares the same volume, and describes the process of recovering the quorum.

Since pair controls 105-1 and 105-2 are the same program and only perform processing according to the attributes of the volume, if replication is performed by pair control 105-2, the behavior of pair controls 105-1 and 105-2 will be swapped.

The process flow begins with the storage device detecting failure of communication to pair at step 105-1-1. At step 105-1-2, primary volume is elected using quorum and the pair changes to PSUS. At step 105-1-3, a determination is made as to whether the volume has been elected as primary. If the answer is yes, then the process proceeds to step 105-1-4, where a notification is sent to pair control 105-2, which controls another pair that shares the same volume. If the answer is no or step 105-1-4 has been completed, then the process proceeds to step 105-1-5, where flow at pair control 105-1 comes to an end.

On the side of pair control 105-2, the flow starts when the program receives a notification from pair control 105-1 which controls another pair that shares the same volume at step 105-2-1. At step 105-2-2, query is made to the paired storage device which provides the paired volume. At step 105-2-3, a determination is made as to whether another pair that shares the paired volume is suspended. If the answer is yes, the process proceeds to step 105-2-4, a candidate is selected from among the candidates listed in volume management table 101-1 for quorum recovery and the quorum setting of the pair is replaced. If the answer is no, then the process continues to step 105-2-5, where the pair is resynchronized. At step 105-2-6, the flow at pair control 105-2 comes to an end.

Figure 9:
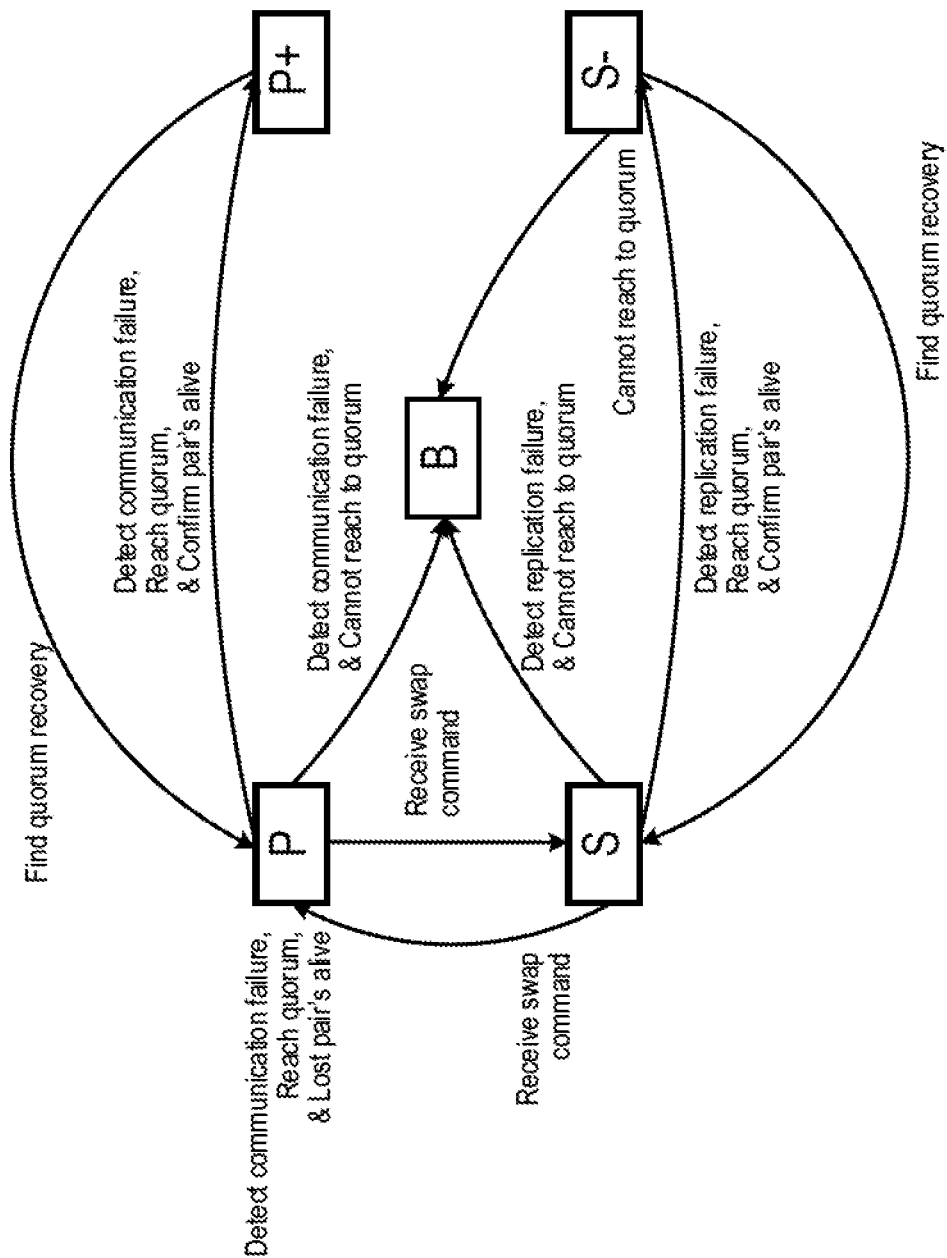
FIG. 9 illustrates state transition method of volume attribution in a pair, in accordance with an example implementation.

FIG. 9 illustrates state transition method of volume attribution in a pair, in accordance with an example implementation.

For the primary state:
1. When it receives swap command, it changes to secondary.
2. When it detects communication failure to the pair and cannot access the quorum, it changes to block.
3. When it receives notification, and detects storage failure which the quorum provides, it changes to primary+.
4 Otherwise, it remains at primary.

For the secondary state:
1. When receives swap command, it changes to primary.
2. When it detects communication failure to the pair and cannot access the quorum, it changes to block.
3. When it receives notification, and detects storage failure which the quorum provides, it changes to secondary–.
4 When it detects communication failure to the pair and is elected as a leader, it changes to primary.
5. Otherwise, it remains at Secondary.

For the primary+ state:
1. When it finds recovery of the quorum, it changes to primary.
2. Otherwise, it remains at primary+.

For the secondary– state:
1. When it finds recovery of the quorum, it changes to secondary.
2. Otherwise, it remains at secondary–.

For the block state:
1. Remains at block until pair resync command is received.

FIG. 10-1 illustrates example state transitions in the event of a storage device failure, in accordance with an example implementation. As shown in FIG. 2, each of the storage devices 100*a*, 100*b*, and 100*c* provides one data store volume and one quorum volume, and storage device 100*d* provides one quorum volume. The storage devices 100*a*, 100*b*, 100*c*, and 100*d* are connected to each other by a network. Any two data store volumes and one quorum volume provided by a storage device other than those providing the data store volumes are used to build a pair, and three data store volumes and three quorum volumes are used to build three replication pairs as illustrated in FIG. 2.

State 00 is the initial state, which is identical as the configuration shown in FIG. 2. The updated data in the data store volume of storage device 100*a* is replicated to storage devices 100*b* and 100*c* in a paired configuration.

State 01 reflects a state after a failure occurs on storage device 100*a* in state 00. The detection of communication lost from storage devices 100*a* to 100*c* triggers leader selection, and as result, failover is performed to storage devices 100*b* and 100*c*. Pair resynchronization is performed between storage devices 100*b* and 100*c* to restore redundancy, and the pair configuration is changed so that storage device 100*d* provides quorum in place of the lost storage device 100*a*.

State 02 reflects a state after a failure occurs on storage device 100*b* in state 00. The detection of communication lost from storage devices 100*a* to 100*c* triggers leader selection, and as result, storage devices 100*a* cuts off storage device 100*b*. Then pair configuration is changed so that storage device 100*d* provides quorum in place of the lost storage device 100*b*.

State 03 is the state after a failure occurs on storage device 100*c* in state 00. The detection of communication lost from storage devices 100*a* to 100*c* triggers leader selection, and as result, storage devices 100*a* cuts off storage device 100*c*. Then pair configuration is changed so that storage device 100*d* provides quorum in place of the lost storage device 100*c*.

FIG. 10-2 illustrates example state transitions in the event of a network path failure, in accordance with an example implementation. State 04 reflects a state after a failure occurs on network path between storage device 100*a* and 100*b* in state 00. The detection of communication lost between storage devices 100*a* and 100*b* triggers leader selection, and as result, replication is stopped between storage devices 100*a* to 100*b*.

After which, pair resynchronization is performed between storage devices 100*b* and 100*c* to restore redundancy, and the pair configuration is changed so that storage device 100*c* replicates data to storage device 100*b*.

State 05 is the state after a failure occurs on network path between storage device 100*a* and 100*c* in state 00. The detection of communication lost between storage devices 100*a* and 100*c* triggers leader selection, and as a result, replication is stopped between storage devices 100*a* to 100*c*.

After which, pair resynchronization is performed between storage devices 100*b* and 100*c* to restore redundancy, and the pair configuration is changed so that storage device 100*b* replicates data to storage device 100*c*.

State 06 is the state after a failure occurs on network path between storage device 100*b* and 100*c* in state 00. Replication between storage devices 100*b* and 100*c* is suspended, so there is no change in the configuration.

FIG. 10-3 illustrates example state transitions in the case of a failure on one storage device in state 04, in accordance with an example implementation. State 07 reflects the state after a failure occurs on storage device 100*a* in state 04. The detection of communication lost from storage devices 100*b* to 100*a* triggers leader selection, and as a result, storage device 100*a* is cut off from storage device 100*b*. After which, the pair configuration between storage device 100*b* and 100*c* is changed so that storage device 100*d* provides quorum in place of the lost storage device 100*a*.

State 08 is the state after a failure occurs on storage device 100*b* in state 04. The detection of lost communication from storage devices 100*c* to 100*b* triggers leader selection, and as a result, storage device 100*b* is cutoff from storage device 100*c*. After which, the pair configuration between storage device 100*a* and 100*c* is changed so that storage device 100*d* provides quorum in place of the lost storage device 100*b*.

State 09 is the state after a failure occurs on storage device 100*c* in state 04. The detection of lost communication from storage devices 100*a* to 100*b* triggers leader selection, and as a result, storage device 100*c* is cutoff from storage devices 100*a* and stopping storage device 100*b* is stopped.

FIG. 10-4 illustrates example state transitions in the case of a failure on one storage device in state 05, in accordance with an example implementation. State 10 is the state after a failure occurs on storage device 100*a* in state 05. The detection of lost communication from storage devices 100*b* to 100*a* triggers leader selection, and as a result, storage device 100*a* is cutoff from storage device 100*b*. After which, the pair configuration between storage device 100*b* and 100*c* is changed so that storage device 100*d* provides quorum in place of the lost storage device 100*a*.

State 11 is the state after a failure occurs on storage device 100*b* in state 05. The detection of lost communication from storage devices 100*a* to 100*b* triggers leader selection, and as a result, storage device 100*b* is cutoff from storage device 100*a* and storage device 100*c* is stopped.

State 12 is the state after a failure occurs on storage device 100*c* in state 05. The detection of lost communication from storage devices 100*b* to 100*c* triggers leader selection, and as a result, storage device 100*c* is cutoff from storage device 100*b*. After which, the pair configuration between storage device 100*a* and 100*b* is changed so that storage device 100*d* provides quorum in place of the lost storage device 100*c*.

FIG. 10-5 illustrates example state transitions in the case of a failure on one storage device in state 06, in accordance with an example implementation. State 13 is the state after a failure occurs on storage device 100*a* in state 06. The detection of lost communication from storage devices 100*b* to 100*a* triggers leader selection, and as a result, storage device 100*b* is cutoff from storage device 100*a* and storage device 100*c* is stopped.

State 14 is the state after a failure occurs on storage device 100*b* in state 06. The detection of lost communication from storage devices 100*a* to 100*b* triggers leader selection, and as a result, storage device 100*b* is cutoff from storage devices 100*a*. After which, the pair configuration between storage device 100*a* and 100*c* is changed so that storage device 100*d* provides quorum in place of the lost storage device 100*b*.

State 15 is the state after a failure occurs on storage device 100*c* in state 06. The detection of lost communication from storage devices 100*a* to 100*c* triggers leader selection, and as a result, storage device 100*c* is cutoff from storage devices 100*a*. After which, the pair configuration between storage device 100*a* and 100*b* is changed so that storage device 100*d* provides quorum in place of the lost storage device 100*c*.

FIG. 10-6 illustrates example state transitions in the case of a failure on one storage device in state 04, in accordance with an example implementation. State 16 is the state after a failure occurs on network path between storage device 100*a* and 100*c* in state 04. The detection of lost communication from storage devices 100*c* to 100*a* triggers leader selection, and as a result, storage device 100*a* is cutoff from storage device 100*c* and storage device 100*a* is stopped. After which, the pair configuration between storage device 100*b* and 100*c* is changed so that storage device 100*d* provides quorum in place of the lost storage device 100*a*.

State 17 is the state after a failure occurs on network path between storage device 100*b* and 100*c* in state 04. The detection of lost communication from storage devices 100*c* to 100*b* triggers leader selection, and as a result, storage device 100*c* is cutoff from storage device 100*b* and storage device 100*b* is stopped. After which, the pair configuration between storage device 100*a* and 100*c* is changed so that storage device 100*d* provides quorum in place of the lost storage device 100*b*.

FIG. 10-7 illustrates example state transitions in the case of a failure on one storage device in state 05, in accordance with an example implementation. State 18 is the state after a failure occurs on network path between storage device 100*a* and 100*b* in state 05. The detection of lost communication from storage devices 100*c* to 100*a* triggers leader selection, and as a result, storage device 100*b* is cutoff from storage device 100*c* and storage device 100*a* is stopped. After which, the pair configuration between storage device 100*b* and 100*c* is changed so that storage device 100*d* provides quorum in place of the lost storage device 100*a*.

State 19 is the state after a failure occurs on network path between storage device 100*b* and 100*c* in state 05. The detection of lost communication from storage devices 100*b* to 100*c* triggers leader selection, and as a result, storage device 100*c* is cutoff from storage device 100*b* and storage device 100*c* is stopped. After which, the pair configuration between storage device 100*a* and 100*b* is changed so that storage device 100*d* provides quorum in place of the lost storage device 100*c*.

FIG. 10-8 illustrates example state transitions in the case of a failure on one storage device in state 06, in accordance with an example implementation. State 20 is the state after a failure occurs on network path between storage device 100*a* and 100*b* in state 06. The detection of lost communication from storage devices 100*a* to 100*b* triggers leader selection, and as a result, storage device 100*a* is cutoff from storage device 100*b* and storage device 100*b* is stopped. After which, the pair configuration between storage device 100*a* and 100*c* is changed so that storage device 100*d* provides quorum in place of the lost storage device 100*b*.

State 21 is the state after a failure occurs on network path between storage device 100*a* and 100*c* in state 06. The detection of lost communication from storage devices 100*a* to 100*c* triggers leader selection, and as a result, storage device 100*c* is cutoff from storage device 100*a* and storage device 100*c* is stopped. After which, the pair configuration between storage device 100*a* and 100*b* is changed so that storage device 100*d* provides quorum in place of the lost storage device 100*c*.

Figure 11:
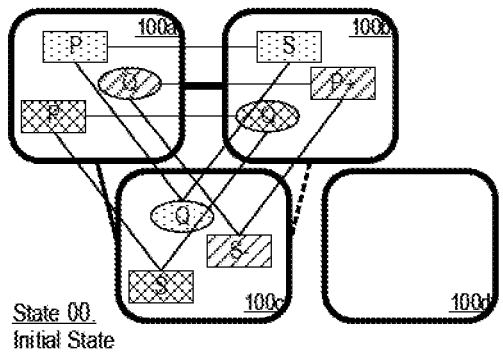
FIG. 11 illustrates example state transitions in restoration of data redundancy and quorum recovery, in accordance with an example implementation.
Figure 11:
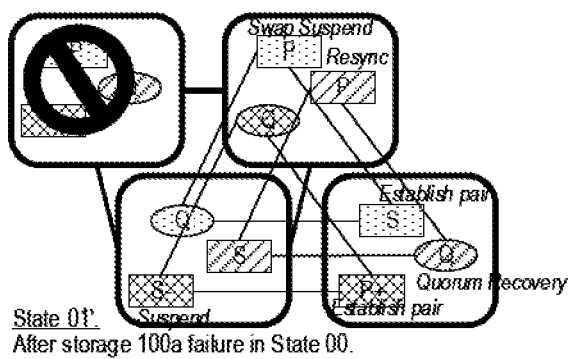
Figure 11:
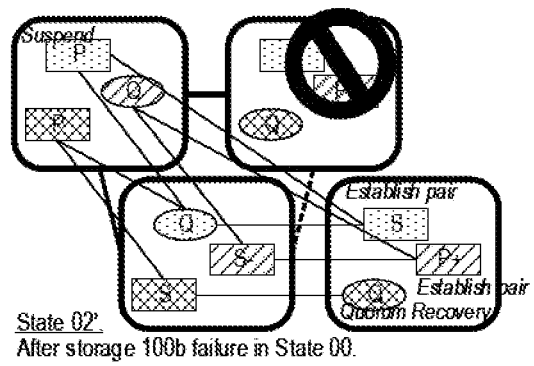
Figure 11:
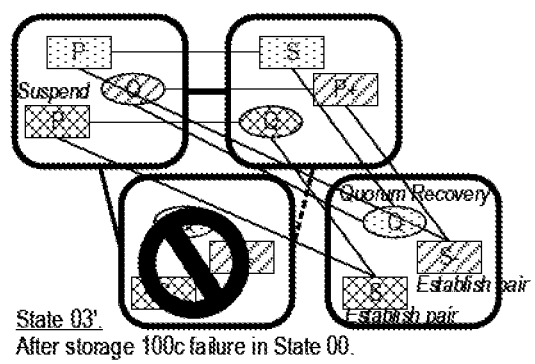

FIG. 11 illustrates example state transitions in restoration of data redundancy and quorum recovery, in accordance with an example implementation. As illustrated in FIG. 11, State 01' has the same basic configuration and behavior as State 01. The difference is that a volume is created on the storage device 100*d* from which quorum was recovered, and the process of creating a triplicate configuration on storage devices 100*a*, 100*c*, and 100*d* is established.

State 02' has the same basic configuration and behavior as State 02. The difference is that a volume is created on the storage device 100*d* from which quorum was recovered, and the process of creating a triplicate configuration on storage devices 100*a*, 100*c*, and 100*d* is established.

In the previous example, it was assumed that the quorum was defined in advance as a candidate and used, but it is also possible to create a quorum volume on demand and use it when quorum recovery becomes necessary.

It is also possible to quadruple the data on storage devices 100*a*, 100*b*, 100*c*, and 100*d* in advance, configure storage devices 100*a*, 100*b*, and 100*c* to provide quorum, and then, when quorum recovery becomes necessary, create a quorum volume on a storage device that does not provide quorum but provides a data store to maintain the redundant configuration.

The foregoing example implementation may have various benefits and advantages. For example, maintaining data redundancy without human intervention and performing automated recovery in the event of failure. Furthermore, continuity of applications and operations is increased in the process. In addition, example implementations allow for effective failure point determination by comparing the status of each pair belonging to the same one volume.

Figure 12:
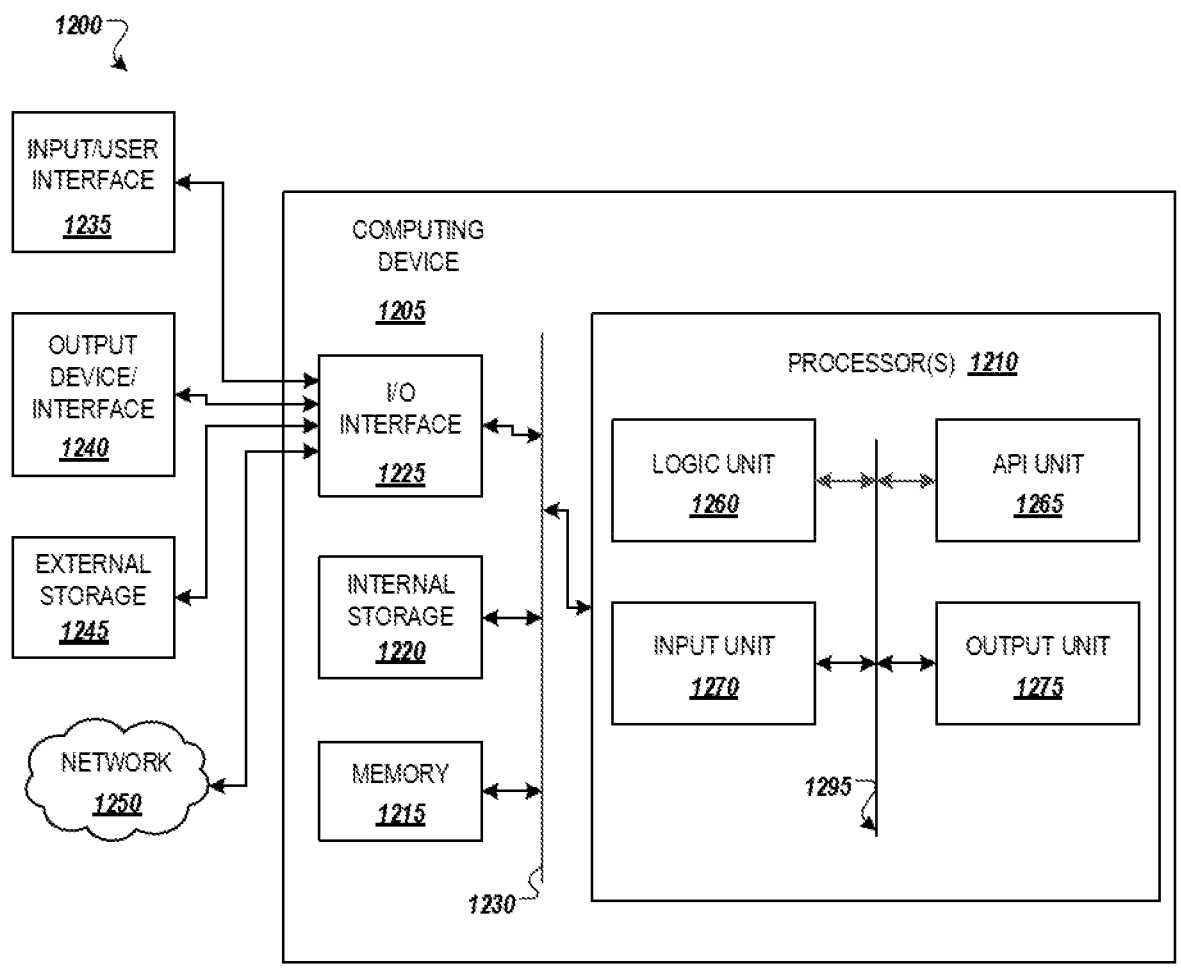
FIG. 12 illustrates an example computing environment with an example computer device suitable for use in some example implementations.

FIG. 12 illustrates an example computing environment with an example computer device suitable for use in some example implementations. Computer device 1205 in computing environment 1200 can include one or more processing units, cores, or processors 1210, memory 1215 (e.g., RAM, ROM, and/or the like), internal storage 1220 (e.g., magnetic, optical, solid-state storage, and/or organic), and/or IO interface 1225, any of which can be coupled on a communication mechanism or bus 1230 for communicating information or embedded in the computer device 1205. IO interface 1225 is also configured to receive images from cameras or provide images to projectors or displays, depending on the desired implementation.

Computer device 1205 can be communicatively coupled to input/user interface 1235 and output device/interface 1240. Either one or both of the input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1240 may include a display, television, monitor, printer, speaker, braille, or the like. In some example implementations, input/user interface 1235 and output device/interface 1240 can be embedded with or physically coupled to the computer device 1205. In other example implementations, other computer devices may function as or provide the functions of input/user interface 1235 and output device/interface 1240 for a computer device 1205.

Examples of computer device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1205 can be communicatively coupled (e.g., via IO interface 1225) to external storage 1245 and network 1250 for communicating with any number of networked components, devices, and systems, including one or more computer devices of the same or different configuration. Computer device 1205 or any connected computer device can be functioning as, providing services of, or referred to as a server, client, thin server, general machine, special-purpose machine, or another label.

IO interface 1225 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computer device 1205 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, and inter-unit communication mechanism 1295 for the different units to communicate with each other, with the OS, and with other applications (not shown). The described units and elements can be varied in design, function, configuration, or implementation and are not limited to the descriptions provided. Processor(s) 1210 can be in the form of hardware processors such as central processing units (CPUs) or in a combination of hardware and software units.

In some example implementations, when information or an execution instruction is received by API unit 1265, it may be communicated to one or more other units (e.g., logic unit 1260, input unit 1270, output unit 1275). In some instances, logic unit 1260 may be configured to control the information flow among the units and direct the services provided by API unit 1265, the input unit 1270, the output unit 1275, in some example implementations described above. For example, the flow of one or more processes or implementations may be controlled by logic unit 1260 alone or in conjunction with API unit 1265. The input unit 1270 may be configured to obtain input for the calculations described in the example implementations, and the output unit 1275 may be configured to provide an output based on the calculations described in example implementations.

Processor(s) 1210 can be configured to create pairs of quorum sets, wherein each pair of the pairs of quorum sets comprises at least two volumes and a quorum, and each of at least two volumes and quorum are located at different storage devices as shown in FIGS. 2-7 and 10-11. The processor(s) 1210 may also be configured to, for a failure occurring in a storage device associated with the pairs of quorum sets or in a network communication between storage devices of the pairs of quorum sets, modify volume attributes associated with volumes of the pairs of quorum sets as shown in FIGS. 2-7 and 10-11. The processor(s) 1210 may also be configured to, for the failure occurring in a storage device associated with the pairs of quorum sets, relocate quorum associated with the failed storage device to another storage device that is different from storage devices associated with the pairs of quorum sets as shown in FIGS. 2-7 and 10-11.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for redundancy loss recovery, the method comprising:
    creating pairs of quorum sets, wherein each pair of the pairs of quorum sets comprises at least two volumes and a quorum, and each of at least two volumes and quorum are located at different storage devices;
    for a failure occurring in a storage device associated with the pairs of quorum sets or in a network communication between storage devices of the pairs of quorum sets, modifying volume attributes associated with volumes of the pairs of quorum sets; and
    for the failure occurring in a storage device associated with the pairs of quorum sets, relocating quorum associated with the failed storage device to another storage device that is different from storage devices associated with the pairs of quorum sets.

2. The method of claim 1,
wherein each of the volume attributes is associated with one of primary, primary plus, secondary, secondary minus, and blocked; and
wherein the modifying the volume attributes comprises:
for a volume having primary as volume attribute, transitioning from primary to:
secondary, for receipt of a swap command,
block, for a failure of network communication to a pair of quorum set associated with the volume fails and being unable to access quorum of the pair of quorum set, and
primary plus, for receipt of a notification indicating communication failure and being able to access quorum of the pair of quorum set,
for a volume having secondary as volume attribute, transitioning from secondary to:
primary, for receipt of a swap command,
primary, for a failure of network communication to a pair of quorum set associated with the volume and electing the volume as a leader volume,
secondary minus, for receipt of a notification indicating communication failure is received and being unable to access quorum of the pair of quorum set, and
block, for a failure of network communication to the pair of quorum set associated with the volume and being unable to access the quorum of the pair of quorum set,
for a volume having primary plus as volume attribute, transitioning from primary plus to:
primary, for performance of a quorum recovery with a pair of quorum set associated with the volume, wherein the quorum recovery replaces quorum associated with the volume's associated pair of quorum set with a quorum candidate associated with another storage device that is different from storage devices associated with the pair of quorum set,
for a volume having secondary minus as volume attribute, transitioning from secondary minus to:
secondary, for performance of a quorum recovery with a pair of quorum set associated with the volume, wherein the quorum recovery replaces quorum associated with the volume's associated pair of quorum set with a quorum candidate associated with another storage device that is different from storage devices associated with the pair of quorum set, and
for a volume having block as volume attribute, transitioning out of the volume attribute when a resync command is received.

3. The method of claim 1,
wherein the pairs of quorum sets comprise a first quorum set pair, a second quorum set pair, and a third quorum set pair, the pairs of quorum sets are interconnected by communication networks;
wherein the pairs of quorum sets are formed between three storage devices, the three storage devices comprise a first storage device, a second storage device, and a third storage device, and redundant copies are made from the first storage device to the second storage device and the third storage device;
wherein, under an initial state, the first quorum set pair comprises a volume at the first storage device with volume attribute of primary, a volume at the second storage device with volume attribute of secondary, and a quorum at the third storage device;
wherein, under the initial state, the second quorum set pair comprises the volume at the first storage device with volume attribute of primary, a quorum at the second storage device, and a volume at the third storage device with volume attribute of secondary;
wherein, under the initial state, the third quorum set pair comprises a quorum at the first storage device, the volume at the second storage device with volume attribute of primary plus, and the volume at the third storage device with volume attribute of secondary minus; and
wherein, redundant copies of the volume at the first storage device are made at the volume at the second storage device and the volume at the third storage device.

4. The method of claim 1, wherein:
for detecting pair failure of a pair of quorum sets of the pairs of quorum sets, electing a volume of the pair of quorum set as leader and setting volume attribute of the volume as primary using quorum of the pair of quorum set;
notifying another pair of quorum set that shares the volume of the pair failure;
determining whether the another pair of quorum set is suspended;
for the another pair of quorum set being suspended, recovering quorum of the another pair of quorum set with a quorum candidate; and
for the another pair of quorum set being not suspended, resyncing the another pair of quorum set.

5. The method of claim 1,
wherein the pairs of quorum sets comprise a first quorum set pair, a second quorum set pair, and a third quorum set pair, the pairs of quorum sets are interconnected by communication networks;
wherein the pairs of quorum sets are formed between three storage devices, the three storage devices comprise a first storage device, a second storage device, and a third storage device, and redundant copies are made from the first storage device to the second storage device and the third storage device;
wherein, under an initial state, the first quorum set pair comprises a volume at the first storage device with volume attribute of primary, a volume at the second storage device with volume attribute of secondary, and a quorum at the third storage device;
wherein, under the initial state, the second quorum set pair comprises the volume at the first storage device with volume attribute of primary, a quorum at the second storage device, and a volume at the third storage device with volume attribute of secondary;
wherein, under the initial state, the third quorum set pair comprises a quorum at the first storage device, the volume at the second storage device with volume attribute of primary plus, and the volume at the third storage device with volume attribute of secondary minus;
wherein, redundant copies of the volume at the first storage device are made at the volume at the second storage device and the volume at the third storage device;
wherein, for a failure of the first storage device under the initial state and entering a first state:

the volume at the second storage device that is associated with the first quorum set pair is elected as leader and suspended,
the volume at the third storage device that is associated with the second quorum set pair is suspended, and
quorum recovery for the third quorum set pair is performed through quorum at a fourth storage device, and the volume at the second storage device that is associated with the third quorum set pair is resynced;

wherein, for a failure of the second storage device under the initial state and entering a second state:
the volume at the first storage device that is associated with the first quorum set pair is suspended, and
quorum recovery for the second quorum set pair is performed through quorum at the fourth storage device; and wherein, for a failure of the third storage device under the initial state and entering a third state:
quorum recovery for the first quorum set pair is performed through quorum at the fourth storage device, and
the volume at the first storage device that is associated with the second quorum set pair is suspended.

6. The method of claim 5,
wherein, for a failure of communication network between the first storage device and the third storage device under the initial state and entering a fourth state:
the second quorum set pair is suspended, and
the volume at the third storage device that is associated with the third quorum set pair is resynced;

wherein, for a failure of the first storage device under the fourth state and entering a fifth state:
the volume at the second storage device that is associated with the first quorum set pair is elected as leader and suspended, and
quorum recovery for the third quorum set pair is performed through quorum at the fourth storage device;

wherein, for a failure of the second storage device under the fourth state and entering a sixth state:
the volume at the first storage device that is associated with the first quorum set pair is suspended,
the volume at the third storage device that is associated with the second quorum set pair is blocked, and
the volume at the third storage device that is associated with the third quorum set pair is suspended; and wherein, for a failure of the third storage device under the fourth state and entering a seventh state:
quorum recovery for the first quorum set pair is performed through quorum at the fourth storage device, and
the volume at the second storage device that is associated with the third quorum set pair is suspended.

7. The method of claim 6,
wherein, for a failure of communication network between the first storage device and the second storage device under the fourth state and entering an eighth state:
the volume at the first storage device that is associated with the first quorum set pair is blocked, the volume at the second storage device that is associated with the first quorum set pair is elected as leader and suspended, and
quorum recovery for the third quorum set pair is performed through quorum at the fourth storage device and third quorum set pair is resynced; and wherein, for a failure of communication network between the second storage device and the third storage device under the fourth state and entering a ninth state:
quorum recovery for the first quorum set pair is performed through quorum at the fourth storage device,
the volume at the third storage device that is associated with the second quorum set pair is blocked, and
the volume at the third storage device that is associated with the third quorum set pair is blocked.

8. The method of claim 1,
wherein the pairs of quorum sets comprise a first quorum set pair, a second quorum set pair, and a third quorum set pair, the pairs of quorum sets are interconnected by communication networks;
wherein the pairs of quorum sets are formed between three storage devices, the three storage devices comprise a first storage device, a second storage device, and a third storage device, and redundant copies are made from the first storage device to the second storage device and the third storage device;
wherein, under an initial state, the first quorum set pair comprises a volume at the first storage device with volume attribute of primary, a volume at the second storage device with volume attribute of secondary, and a quorum at the third storage device;
wherein, under the initial state, the second quorum set pair comprises the volume at the first storage device with volume attribute of primary, a quorum at the second storage device, and a volume at the third storage device with volume attribute of secondary;
wherein, under the initial state, the third quorum set pair comprises a quorum at the first storage device, the volume at the second storage device with volume attribute of primary plus, and the volume at the third storage device with volume attribute of secondary minus;
wherein, redundant copies of the volume at the first storage device are made at the volume at the second storage device and the volume at the third storage device;
wherein, for a failure of communication network between the first storage device and the second storage device under the initial state and entering a first state:
the first quorum set pair is suspended, and
the volume at the third storage device that is associated with the third quorum set pair is elected as leader, and the volume at the second storage device that is associated with the third quorum set pair is resynced;
wherein, for a failure of communication network between the first storage device and the third storage device under the initial state and entering a second state:
the second quorum set pair is suspended, and
the volume at the third storage device that is associated with the third quorum set pair is resynced; and
wherein, for a failure of communication network between the second storage device and the third storage device under the initial state and entering a third state:
no change is made to the pairs of quorum sets.

9. The method of claim 8,
wherein, for a failure of the first storage device under the third state and entering a fourth state:
the volume at the second storage device that is associated with the first quorum set pair is elected as leader and suspended,
the volume at the third storage device that is associated with the second quorum set pair is suspended, and the volume at the third storage device that is associated with the third quorum set pair is blocked, and the third quorum set pair is suspended;

wherein, for a failure of the second storage device under the third state and entering a fifth state:
the volume at the first storage device that is associated with the first quorum set pair is suspended, and
quorum recovery for the second quorum set pair is performed through quorum at the fourth storage device; and wherein, for a failure of the third storage device under the third state and entering a sixth state:
quorum recovery for the first quorum set pair is performed through quorum at the fourth storage device,
the volume at the first storage device that is associated with the second quorum set pair is suspended, and
the volume at the second storage device that is associated with the third quorum set pair is suspended.

10. The method of claim 9,
wherein, for a failure of communication network between the first storage device and the second storage device under the third state and entering a seventh state:
the volume at the second storage device that is associated with the first quorum set pair is blocked, and the volume at the first storage device that is associated with the first quorum set pair is suspended, and
quorum recovery for the second quorum set pair is performed through quorum at the fourth storage device; and wherein, for a failure of communication network between the first storage device and the third storage device under the third state and entering a eighth state:
quorum recovery for the first quorum set pair is performed through quorum at the fourth storage device, and
the volume at the third storage device that is associated with the second quorum set pair is blocked, and the volume at the first storage device that is associated with the second quorum set pair is suspended.

11. The method of claim 1,
wherein the pairs of quorum sets comprise a first quorum set pair, a second quorum set pair, and a third quorum set pair, the pairs of quorum sets are interconnected by communication networks;
wherein the pairs of quorum sets are formed between three storage devices, the three storage devices comprise a first storage device, a second storage device, and a third storage device, and redundant copies are made from the first storage device to the second storage device and the third storage device;
wherein, under an initial state, the first quorum set pair comprises a volume at the first storage device with volume attribute of primary, a volume at the second storage device with volume attribute of secondary, and a quorum at the third storage device;
wherein, under the initial state, the second quorum set pair comprises the volume at the first storage device with volume attribute of primary, a quorum at the second storage device, and a volume at the third storage device with volume attribute of secondary;
wherein, under the initial state, the third quorum set pair comprises a quorum at the first storage device, the volume at the second storage device with volume attribute of primary plus, and the volume at the third storage device with volume attribute of secondary minus;

wherein, redundant copies of the volume at the first storage device are made at the volume at the second storage device and the volume at the third storage device;

wherein, for a failure of communication network between the first storage device and the second storage device under the initial state and entering a first state:
the first quorum set pair is suspended, and
the volume at the third storage device that is associated with the third quorum set pair is elected as leader, and the volume at the second storage device that is associated with the third quorum set pair is resynced;

wherein, for a failure of the first storage device under the first state and entering a second state:
the volume at the third storage device that is associated with the second quorum set pair is elected as leader and suspended, and
quorum recovery for the third quorum set pair is performed through quorum at the fourth storage device;

wherein, for a failure of the second storage device under the first state and entering a third state:
quorum recovery for the second quorum set pair is performed through quorum at the fourth storage device, and
the volume at the third storage device that is associated with the third quorum set pair is suspended; and wherein, for a failure of the third storage device under the first state and entering a fourth state:
the volume at the second storage device that is associated with the first quorum set pair is blocked,
the volume at the first storage device that is associated with the second quorum set pair is suspended, and
the volume at the second storage device that is associated with the third quorum set pair is blocked.

12. The method of claim 11,
wherein, for a failure of communication network between the first storage device and the third storage device under the first state and entering a fifth state:
the volume at the third storage device that is associated with the second quorum set pair is elected as leader and suspended, and the volume at the first storage device that is associated with the second quorum set pair is blocked, and
quorum recovery for the third quorum set pair is performed through quorum at the fourth storage device; and wherein, for a failure of communication network between the second storage device and the third storage device under the first state and entering a sixth state:
the volume at the second storage device that is associated with the first quorum set pair is blocked,
quorum recovery for the second quorum set pair is performed through quorum at the fourth storage device, and
the volume at the third storage device that is associated with the third quorum set pair is suspended, and the volume at the second storage device that is associated with the third quorum set pair is suspended.

13. The method of claim 12,
wherein, for a failure of the first storage device under the initial state and entering a seventh state:
the volume at the second storage device that is associated with the first quorum set pair is elected as leader and suspended,
the volume at the third storage device that is associated with the second quorum set pair is suspended, and quorum recovery for the third quorum set pair is performed through quorum at a fourth storage device, and the volume at the second storage device that is associated with the third quorum set pair is resynced;

wherein, for a failure of the second storage device under the initial state and entering an eighth state:
the volume at the first storage device that is associated with the first quorum set pair is suspended, and
quorum recovery for the second quorum set pair is performed through quorum at the fourth storage device;

wherein, for a failure of the third storage device under the initial state and entering a ninth state:
quorum recovery for the first quorum set pair is performed through quorum at the fourth storage device, and
the volume at the first storage device that is associated with the second quorum set pair is suspended;

wherein, the seventh state further comprises:
the volume at the second storage device that is associated with the first quorum set pair is elected as leader and suspended, and a volume at the fourth storage device is used to reestablish the first quorum set pair,
the volume at the fourth storage device is used to reestablish the second quorum set pair, and the volume at the third storage device that is associated with the second quorum set pair is suspended, and
quorum recovery for the third quorum set pair is performed through quorum at the fourth storage device, and the volume at the second storage device that is associated with the third quorum set pair is resynced;

wherein, the eighth state further comprises:
the volume at the fourth storage device is used to reestablish the first quorum set pair, and the volume at the first storage device that is associated with the first quorum set pair is suspended,
quorum recovery for the second quorum set pair is performed through quorum at the fourth storage device, and
the volume at the fourth storage device is used to reestablish the third quorum set pair; and wherein, the ninth state further comprises:
quorum recovery for the first quorum set pair is performed through quorum at the fourth storage device,
the volume at the fourth storage device is used to reestablish the second quorum set pair, and the volume at the first storage device that is associated with the second quorum set pair is suspended, and
the volume at the fourth storage device is used to reestablish the third quorum set pair.

* * * * *